United States Patent Office 3,035,307
Patented May 22, 1962

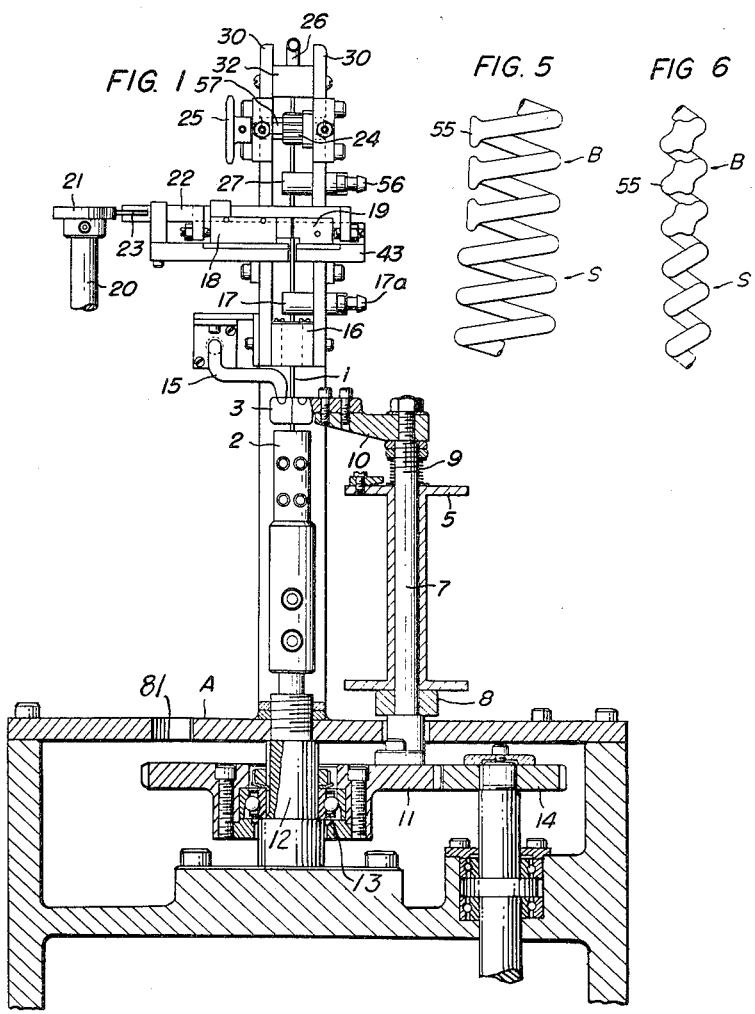

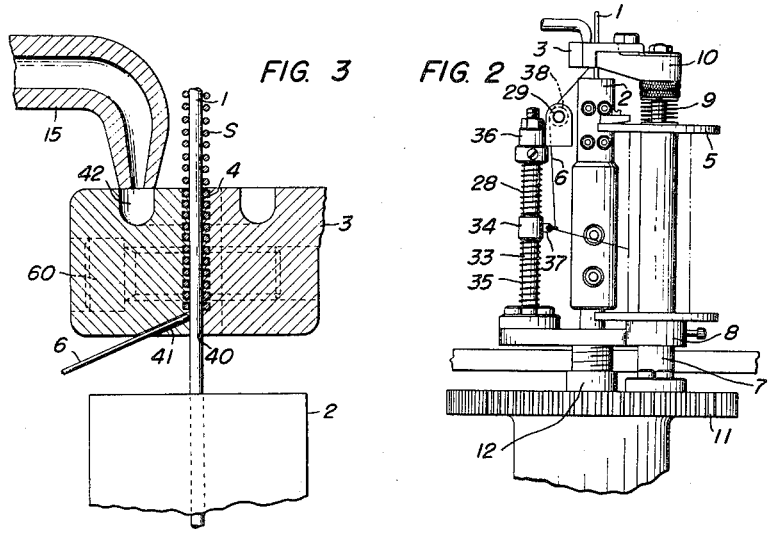
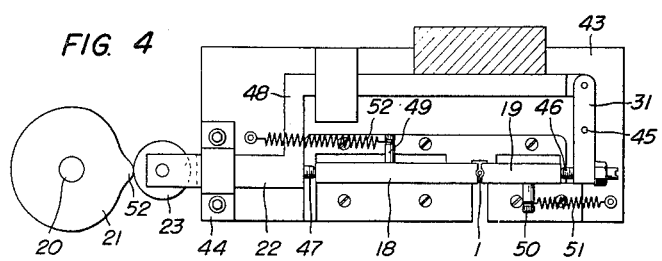

3,035,307
APPARATUS TO MANUFACTURE SLIDE FASTENER ELEMENTS
Tadao Yoshida, 339/2 Suwadacho Ichikawa-shi, Chiba-ken, Japan
Filed July 23, 1959, Ser. No. 829,087
Claims priority, application Japan Oct. 8, 1958
1 Claim. (Cl. 18—19)

This invention relates to an apparatus for manufacturing slide fastener elements from cords or wires of thermoplastic synthetic resins, such as polyvinyl chloride, polyethylene, etc.

According to the present invention, a wire made of a thermoplastic resin is wound around a fixed mandrel of appropriate form, and is simultaneously heated so that a continuous spiral coil having a definite pitch may be formed. The spiral coil thus formed is pressed from both sides by movable dies so that an engaging portion for effecting the fastening function may be formed on each turn of the coil at a predetermined position. The engaging portions thus formed on the successive turns are positioned on a common straight line. After the engaging portions are thus formed, the spiral coil is cooled to be set in the molded form.

In the apparatus according to the present invention, a rotary head is provided for rotation about a fixed mandrel, and a supply reel of a thermoplastic resin wire and a spiral coil forming means for forming the resin wire from said reel into a continuous spiral coil are mounted on said rotary head. On the stationary part of the apparatus, are provided a heating means disposed along said mandrel for heating the spiral forming means, a second heating means for softening the spiral coil formed by said spiral forming means so that the strain of the coil may be removed, a punch means for forming the softened spiral coil into a predetermined form, and a cooling means for cooling the spiral coil thus formed so that its form may be set.

An object of the present invention is to provide an apparatus for manufacturing slide fastener elements wherein a wire of thermoplastic resin material is continuously fed forward and wound around a mandrel while being heated so as to continuously form a spiral coil having a definite pitch, the advancing movement of a portion of said spiral coil is then stopped, a punching action is applied to said portion of coil while it is stopped, and said portion that has been subjected to the punching action is again advanced.

A further object of the present invention is to provide an apparatus for continuously and automatically manufacturing continuous fastener elements from a wire made of a thermoplastic resin material.

Another object of the present invention is to provide an apparatus for manufacturing slide fastener elements, comprising a fixed mandrel, a spiral coil forming head having a rotary die for continuously forming a spiral coil of a thermoplastic resin wire around said mandrel, a heating means for heating said die, heating and cooling means arranged in succession along said mandrel following said rotary die, a punching die head arranged next said cooling means across said mandrel, a rotary toothed wheel opposed to said mandrel so as to engage the spiral coil wound on the mandrel, and a mechanism for driving said first and second mentioned heads and said rotary toothed wheel in a definite relation.

There are other objects and particularities of the present invention, which will be obvious from the following descriptions with reference to the accompanying drawings illustrating a preferred embodiment of the present invention, wherein:

FIGURE 1 is a side elevational view partly in section of a spiral coil forming means in an apparatus embodying the present invention;

FIGURE 2 is an elevational view showing the spiral coil forming head only;

FIGURE 3 is an enlarged sectional view of the rotary die in the head shown in FIGURE 2 and the nozzle for blowing hot air;

FIGURE 4 is an enlarged plan view of the punching head and associated cam means incorporated in the apparatus shown in FIGURE 1, the punching dies being shown in closed position;

FIGURE 5 is a side view of a spiral coil for slide fastener element as formed by the present invention, a portion being shown in its state directly before the engaging portions are formed;

FIGURE 6 is a plan view of the same;

Figure 7:
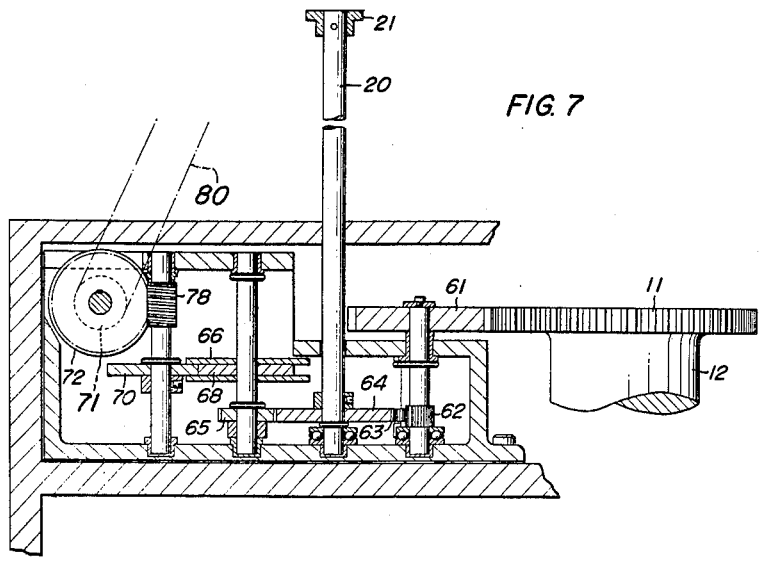
FIGURE 7 is a sectional view showing a gear mechanism for driving in a definite relation the spiral coil forming head particularly shown in FIGURE 2, the punching head particularly shown in FIGURE 3 and the rotary toothed wheel shown in FIGURE 1.

Referring to the drawings, a mandrel 1 on which a wire 6 of thermoplastic resin material is to be wound is mounted stretched between a holder 2 vertically mounted on a stationary framework A of the machine and a block 32 bridging a pair of vertical supporting members 30 secured to said stationary framework A. A post 12 is secured to said framework A on the side opposite to said holder 2 and coaxially with said mandrel 1. A rotary disk 11 is rotatably mounted on said post 12 through a bearing means 13 disposed between said post and disk. Said disk 11 is to be driven through a gear 14 by a suitable driving means such as, for example, an electric motor, not shown.

A supply reel 5 is rotatably mounted on a vertical shaft 7 fixed to said disk 11 near its peripheral portion. The vertical shaft 7 is secured at the upper end to one end of an arm 10 by a nut screwed onto said end. The shaft 7 projects upwardly from the rotary disc 11 through a circular groove 81 disposed about the post 12 on the upper plate of the stationary framework A. The shaft 7 revolves in the groove 81 about the post 12. A compression spring 9 is wound about the upper end portion of the shaft 7 between the upper flange of the reel 5 and the arm 10.

A spiral coil forming die 3 is fixed to the other end of said arm 10, and has a central die hole 40 through which is passed said mandrel 1 so that, when the disk 11 is driven by the gear 14, said forming die 3 may rotate in accordance with the revolving movement of the shaft 7. Said die 3 having the die hole 40 consists of two half parts abutting with each other in the plane passing through the center line of said die hole, said parts having recesses to define the hole 40 and being connected with each other by a bolt 60.

The rotary disk 11 and the rotating means comprising the shaft 7 and the die 3 constitute a spiral coil forming head. Said head is further provided with a wire tensioning means. An arm 8 is fixed at one end to the lower end portion of the shaft 7 and supports a vertical post 33 fixed to the arm 8 at the other end. A slide 34 is mounted on said post 33 slidably in the neutral position by springs 28 and 35 wound around said post on opposite sides of the member 34. The upper spring 28 is held in position by a collar 36 fixed to the upper end of the post 33. The slide 34 is provided with a hook 37 which is adapted to slidably engage the resin wire 6 on the side opposite to the reel 5. Said collar 36 is provided with a guide roller 38 on the same side of the post as of said hook. The thermoplastic resin wire 6 is to be fed through the die 3 by way of the hook 37 and roller 38 from the supply reel 5 and is to be wound around the mandrel 1 by the rotation of the spiral coil forming head.

The compression spring 9 acting between the arm 10 and the flange of the reel 5 tends to maintain the tension of the wire 6 uniform as the wire is being continuously pulled out of the reel 5. In addition, the slide 34 and springs 28 and 35 serve to absorb any vibration of the wire due to the high speed rotation for keeping the wire tension uniform.

As described above, the spiral coil forming die or rotary die 3 is fixed to the outer end of the arm 10, and is provided with the die hole 40 through which the mandrel 1 passes centrally as clearly shown in FIGURE 3. A spiral groove 4 is formed in the inner peripheral wall of said die hole 40. This spiral groove 4 is formed continuously from a point near the lower end to the upper end of the die hole 40. The lower end or beginning portion of the groove 4 is communicated with the outside of the lower surface of the die 3 through an inclined bore 41. Before the beginning of the spiral coil forming operation, the two half parts of the die 3 are separated from each other by removing the fastening bolt 60, the end of the wire 6 is manually inserted into said bore 41, the part of the wire 6 projecting out of the bore 41 is wound on the mandrel 1 until it reaches a feeding means 24 hereinafter to be described, and then two parts of the die 3 are again united together by the bolt 60.

In the above described condition, when the disk 11 rotates and the spiral coil forming head causes the revolving movement, the wire 6 will be continuously formed into a spiral coil in the spiral passage formed between said spiral groove 4 and the peripheral surface of the mandrel 1, and will be advanced towards the outlet port of the die 3. As said rotation is continued, the spiral coil will come out through the outlet port of the die 3, sliding along the peripheral surface of the mandrel 1. Thus, a continuous spiral coil S will be formed of the thermoplastic resin material.

During the above described operation and process, in order to facilitate the formation of the spiral coil, the thermoplastic resin wire 6 is heated while it is within the die 3. This heating can be effected by blowing heated air onto the die 3. In the present apparatus, in order that the heating operation may be effective, the upper end surface of the die 3 is provided with an annular groove 42 around the die hole 40. A blowing nozzle 15 is disposed opposite said annular groove 42 so that hot air may be blown onto the rotating groove 42, whereby the die 3 will sufficiently be heated. The nozzle 15 is secured to a part fixed to the supporting members 30 and is connected to a suitable source, not shown, of hot air.

The spiral coil formed by the rotary die will pass through a heater 16 mounted on the supporting members 30, will be heated there, will have the strain removed, and then will be set in a correct coil form by cold air blown by a cooling means 17 mounted on one of the supporting members 30. Said cooling means 17 is provided with a nozzle and is connected to a suitable source of cooling medium through a pipe 17a. Cold air is thus blown onto the coil S through the above-mentioned nozzle.

After the spiral coil has been removed the strain and cooled set in a correct shape of spiral coil, it is feed into a punching head provided with dies 18 and 19. In this punching head, the spiral coil S is formed with engaging portions for performing the fastening function on one side of the coil. A rotary toothed wheel 24 is mounted on the supporting members 30 so as to advance a portion of the spiral coil into said punching head. Said rotary toothed wheel 24 is to make a periodical feeding motion in synchronism with the opening operation of the dies 18 and 19 so as to feed a definite axial length of the coil between the punching dies 18 and 19 and to stop said length in this position during the next punching operation. This feeding means and its driving mechanism shall be described later.

As shown in FIGURE 4, the punching head comprises the dies 18 and 19 slidably mounted on a base plate 43 so as to approach each other from the opposite sides of the mandrel 1 and to then separate from each other and return to the original positions. Said base plate 43 can suitably be fixed to a stationary part of the present apparatus or can be fixed to the supporting members 30 by a suitable means. A reciprocating rod 22 is slidably supported above the base plate 43 by a bearing 44 disposed on said plate. Said rod 22 is hinged at its end to one end of a lever 31 which in turn is pivoted to the base plate 43 by a pin 45. An abutment 46 is adjustably secured to the other end of said lever 31, and another abutment 47 is fixed to the inner wall of the angle portion 48 of said rod 22 in alignment with the first mentioned abutment 46.

Between these abutments 46 and 47, the two punching dies 18 and 19 are disposed slidably on the base plate 43. Said punching dies 18 and 19 have studs 49 and 50, respectively, with which are respectively engaged the ends of springs 51 and 52 acting in opposite directions to drive the studs ends from each other, the other ends of said springs being fixed to the base plate 43. Consequently, the punching dies 18 and 19 normally form between their opposed ends a space for free pass of the spiral coil for the fastener element. FIGURE 4 shows the rod 22 as pushed rightwards and the two punching dies 18 and 19 as closed to press the spiral coil on the mandrel 1 from both sides.

The above described operation of the punching dies 18 and 19 is effected by a cam 21 carried by the upper end of a vertical shaft 20 rotatably mounted on the framework of the apparatus by suitable means not shown (FIGURE 1). Referring to FIGURE 4, the cam 21 is provided on a portion of its periphery with a lobe 52 which engages a roller 23 forming a cam follower rotatably mounted on the outer end of the rod 22.

With the above arrangement, as the cam 21 rotates, the rod 22 will make a reciprocating motion. That is to say, when the roller 23 is in contact with the circular peripheral portion of the cam, it is held moved leftwards by the springs 51 and 52. When the cam lobe 52 engages the roller 23, said rod 22 is moved rightwards, the abutment 47 pushes the punching die 18 rightwards, the lever 31 moves clockwise, and the abutment 46 is thereby moved leftwards to push the punching die 19 leftwards. As a result, the two punching dies 18 and 19 will be pressed towards the mandrel 1 and press mold predetermined portions of coil turns around the mandrel. By this pressing operation of the dies 18 and 19, engaging portions for the fastening function will be formed on one side of the spiral coil. As the cam 21 further rotates until the cam lobe 52 again passes the roller 23, the punching die 18 will be pulled by the spring 52 back to the left and the punching die 19 will be pulled by the spring 51 back to the right. Owing to such returning movements, the rod 22 will move leftwards, as the roller 23 rides on the circular periphery of said cam 21.

Along with the aforementioned periodic feeding motion of the rotary toothed wheel 24, the dies 18 and 19 will form the engaging portions on the spiral coil successively. A heating device is set in one die 18 so that the spiral coil S may be heated by its contact with the heated die 18 to be softened to a suitable degree for said forming action. An electric heater, a steam or hot air device may be utilized for said heating.

During the above mentioned operation of the punching dies 18 and 19, the feeding operation of the rotary toothed wheel 24 is kept stopped. However, when the cam follower 23 again contacts the circular periphery of the cam 21, the rotary toothed wheel 24 will resume its feeding operation. By this operation of the rotary toothed wheel 24, another portion of the spiral coil S is fed into the punching head. Thus, the punching operation of said head and the feeding operation will be alternately repeated with a fixed period of time.

After the engaging portions are formed by the punching dies as described above, the spiral coil S passes before a cooling means 27 mounted on one of the supporting members 30, the coil being thereby cooled and consequently set in the given form. Said cooling means is provided at the outer end with a pipe connecting member 56 for supplying cold air and a nozzle for blowing the cold air towards the spiral coil.

In the apparatus according to the present invention, as shown in FIGURE 1, the rotary toothed wheel 24 is disposed between the supporting members 30, and is provided with a rotary shaft 57 disposed perpendicular to the mandrel 1 and borne by a bearing means mounted on the supporting members 30. A sprocket 25 is fixed to the outer end of said shaft 57 and driven by a chain driven by a suitable driving means, not shown, through a speed reduction mechanism, not shown. Said suitable driving means may be the electric motor for driving the disk 11. Said rotary toothed wheel 24 may have the same form as of a spur gear provided on the outer periphery with gear teeth having the same pitch as of the spiral coil S. The gear teeth of said rotary toothed wheel 24 are to mesh with the turns of the spiral coil S so as to feed the coil outwards by rotation. The toothed wheel 24 should be rotated only while the punching dies 18 and 19 are open, but kept stopped while the dies are closed. The spiral coil S will finally be pushed out through a guide pipe 26 supported between the members 30.

Figure 8:
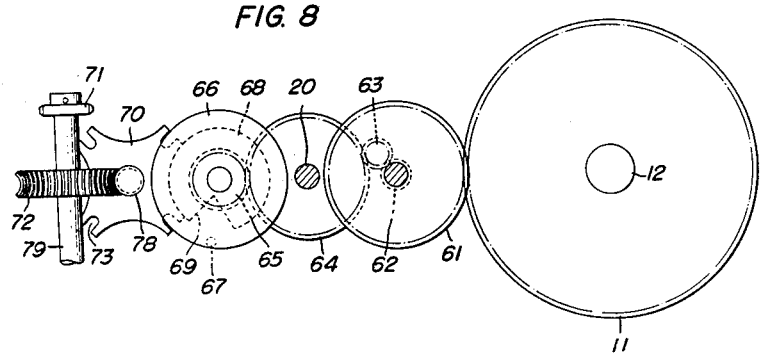
FIGURE 8 is a schematic diagram showing the arrangement of the gears shown in FIGURE 7.

The driving mechanism for controlling the synchronous operation of the reciprocating dies of the punching head with the operation of the feeding means will now be explained with reference to FIGURES 7 and 8.

A gear 61 engages the disc gear 11 for rotating the spiral coil forming head. The rotation of said gear 61 is transmitted to a gear 64 through pinions 62 and 63, and the shaft 20 of the gear 64 is rotated in a definite relation with the rotation of the spiral forming head. As the shaft 20 rotates in such relation, the operation of the punching dies 18 and 19 and that of said head will keep a definite relation and a proper number of turns of the coil will be subjected to the action of the punching dies during one stroke of the dies.

Said gear 64 further drives a pinion 65. A Geneva wheel 66 to rotate with the pinion 65 is coaxially fixed to the pinion 65 and engages a Geneva gear 70. Said wheel 66 is provided with a guide disk 68 to contact with the outer peripheral surface of said Geneva gear 70. A notch 69 is formed in said disk 68. The wheel 66 is provided with a pin 67 on its surface near the outer periphery. As said wheel rotates, said pin 67 will engage each engaging recess 73 in said Geneva gear in succession and will give an indexing motion to said Geneva gear 70. To the rotary shaft of said Geneva gear 70 is fixed a worm gear 78 which meshes with a worm wheel 72 on a shaft 79 for a sprocket 71.

Thus, the rotation of the gear 11 will intermittently rotate the sprocket 71 through the above mentioned train of gear means. As said sprocket 71 and shaft 20 are both included in the above mentioned gear system, they will always act relatively in a definite relation.

The sprockets 71 and 25 (FIGURE 1) are properly placed in a power transmitting relation with each other by an endless chain 80 so as to be driven intermittently by an indexing motion coinciding with that of the sprocket 71.

While only one embodiment of the present invention has been described and shown in detail, it will be obvious to those skilled in the art that various changes and modifications may be made within the scope of the invention.

What I claim is:

Apparatus for manufacturing slide fastener elements, comprising a frame, a holder vertically disposed on said frame, a supporting member on said frame, a fixed mandrel extending between said holder and supporting member, a spiral-coil forming head including a rotary disc and a column fixed on said rotary disc, a reel of thermoplastic resin wire rotatable on said column, a spiral-coil forming die on said column, said spiral-coil forming die including two parts joined to form a bore, said mandrel extending through said bore to said supporting member, said parts defining a spiral groove in said bore surrounding said mandrel, a first heating means adjacent the said spiral-coil forming die, a second heating means disposed about said mandrel and above said spiral-coil forming die for removing strains introduced into the coil, a first cooling means for cooling the coil heated by said second heating means to set the spiral form, a punching die head arranged on said supporting member across said mandrel and next to said first cooling means, a rotary toothed wheel for advancing the spiral-coil disposed on said supporting member and opposed to said mandrel so as to engage the spiral-coil, and a mechanism for driving said spiral-coil forming head, said punching head and said rotary toothed wheel being in a predetermined relation, said mechanism comprising a gear train for rotating said rotary disc and for operating said punching die head, a Geneva wheel driven by said gear train, a Geneva gear engaging said Geneva wheel, and a sprocket intermittently driven by said Geneva gear so that, while said spiral-coil forming head continuously rotates, said rotary toothed wheel operates intermittently at predetermined time intervals and said punching die head is operated in a predetermined relation with the rotation of said spiral-coil forming head.

References Cited in the file of this patent

UNITED STATES PATENTS

| | | |
|---|---|---|
| 1,896,670 | Garst | Feb. 7, 1933 |
| 1,987,333 | Greer | Jan. 8, 1935 |
| 2,275,131 | Conlin | Mar. 3, 1942 |
| 2,393,058 | Pierce et al. | Jan. 15, 1946 |
| 2,541,728 | Wahl | Feb. 13, 1951 |
| 2,593,416 | Dawson | Apr. 23, 1952 |
| 2,636,523 | Hammerschlag | Apr. 28, 1953 |
| 2,740,987 | Moncrieff | Apr. 10, 1956 |
| 2,797,529 | Mohr et al. | July 2, 1957 |